O. P. SMITH.
DOG RACING AMUSEMENT.
APPLICATION FILED SEPT. 4, 1919.

1,379,224.

Patented May 24, 1921.
3 SHEETS—SHEET 2.

O. P. SMITH.
DOG RACING AMUSEMENT.
APPLICATION FILED SEPT. 4, 1919.
1,379,224.
Patented May 24, 1921.
3 SHEETS—SHEET 3.
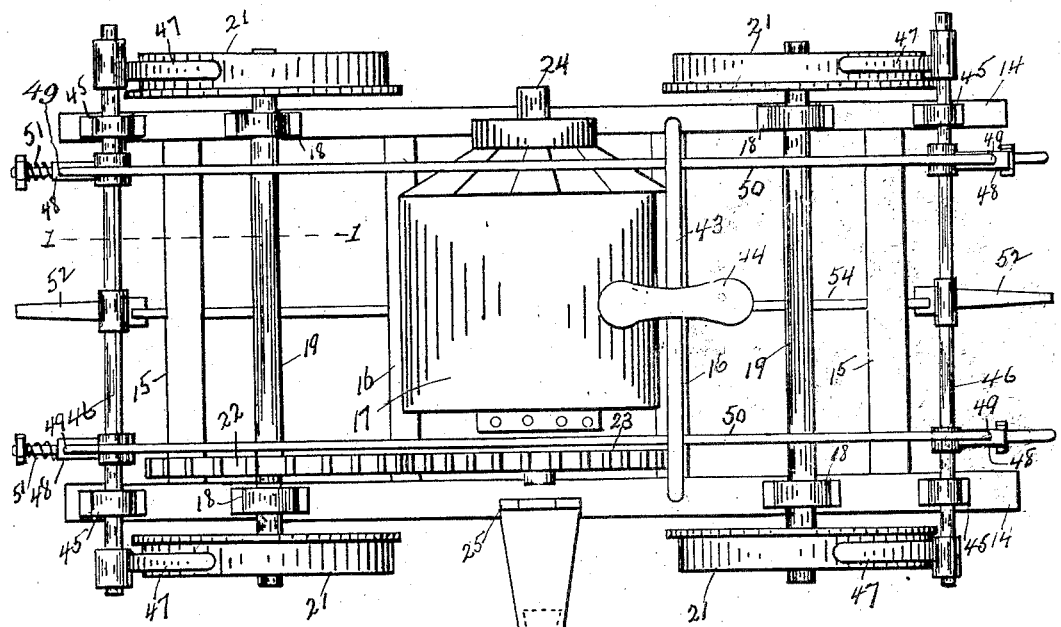
FIG. 3.
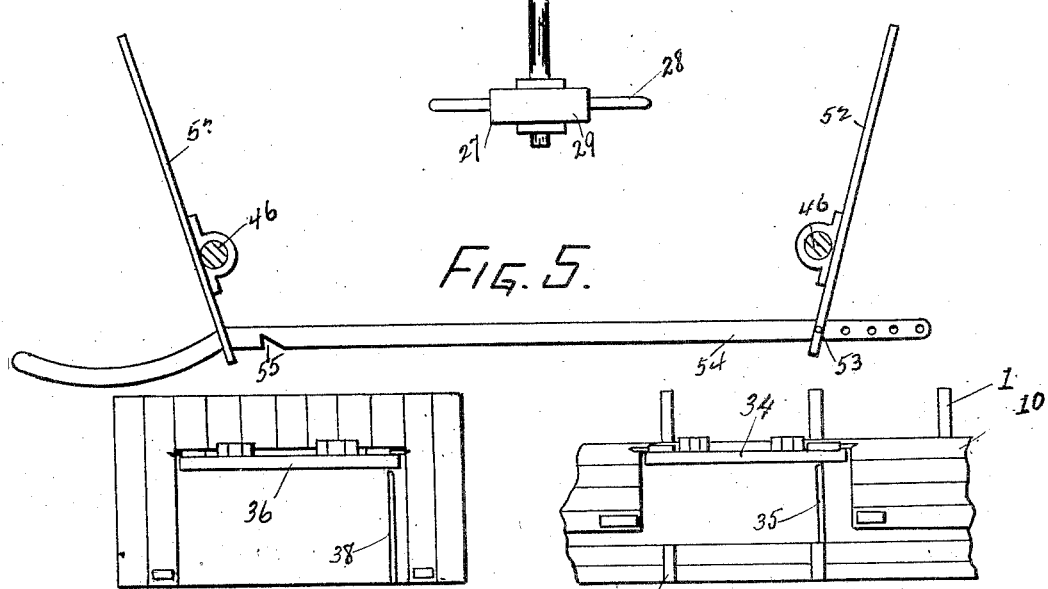
FIG. 5.
FIG. 6.
FIG. 7.
Owen P. Smith
By Chester W. Brown, his Attorney

UNITED STATES PATENT OFFICE.

OWEN P. SMITH, OF CHICAGO, ILLINOIS.

DOG-RACING AMUSEMENT.

1,379,224.  Specification of Letters Patent.  Patented May 24, 1921.

Application filed September 4, 1919. Serial No. 321,612.

*To all whom it may concern:*

Be it known that I, OWEN P. SMITH, a citizen of the United States, residing at the city of Chicago, in the county of Cook and State of Illinois, have invented certain new and useful Improvements in Dog-Racing Amusements, of which the following is a specification.

My invention relates to amusements in which dogs are induced to race about a track by means of a lure or object conveyed mechanically in advance of them.

The object of my present invention is to provide a suitable track, an electric conveyer operated thereon, and a lure or bait to attract the dogs to race thereafter.

Other objects reside in the mechanical construction of the housing for the track and conveyer, the braking mechanism for stopping the said conveyer, the means for mounting and carrying the lure, and the means for concealing the lure within its den at the end of the race.

With the foregoing, and other objects in view, the invention consists of the arrangement and combination of parts as hereinafter described and claimed, and while the invention is not restricted to the exact details of the construction disclosed herein, yet, for the purpose of illustrating a particular embodiment thereof, reference is had to the accompanying drawings, in which like reference characters designate the same parts in the several views, and in which;

Fig. 3 is a top plan view of the conveyer.

Fig. 5 is a detail of the brake releasing mechanism.

Fig. 6 is a detail of the door to the den.

Fig. 7 is a detail of the door to the conveyer housing.

Figure 1:
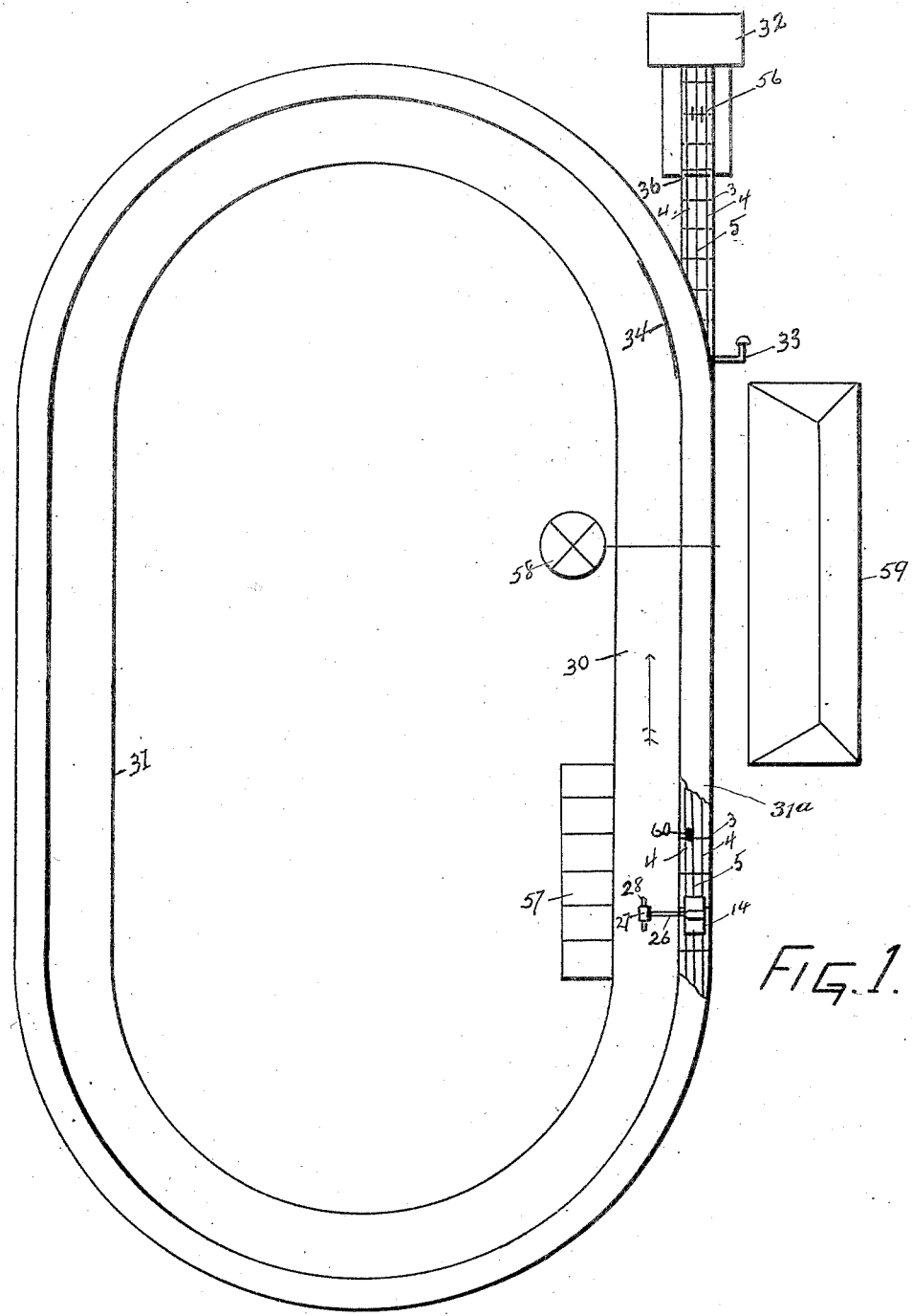
Figure 1 is a plan view of a track for dog racing, with my conveyer installed thereabout.
Figure 2:
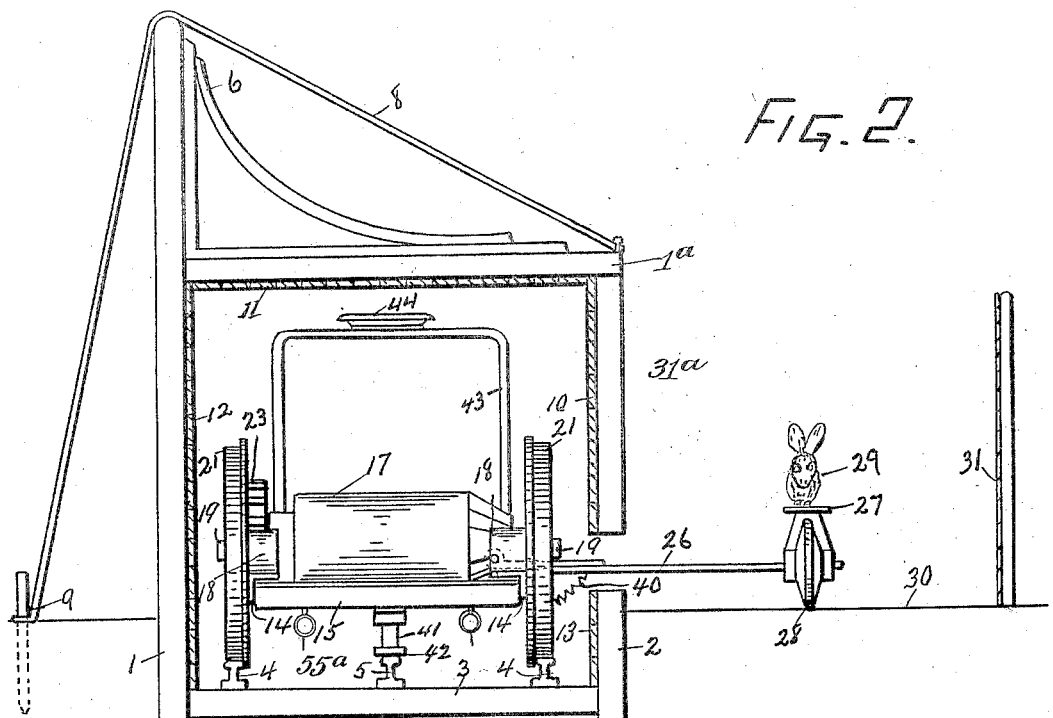
Fig. 2 is a section view of the housing for the track conveyer, etc., showing forward end view of conveyer, brakes removed.
Figure 4:
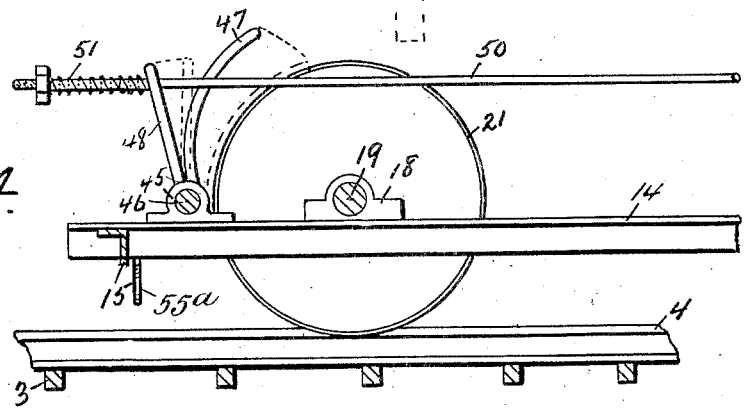
Fig. 4 is a section view of the conveyer taken along the line 1—1 of Fig. 3, showing the brake equipment.

In the construction of my dog racing amusement, I provide a race track for the dogs, as 30, which may be circular, oval, kite-shaped, or any similar shape, and may be of such size as shall be best suited to the space available, and the purpose in view. This race track is fenced on one side by the low fence 31, and on the other side is inclosed by the housing 31$^a$ of the conveyer track, which surrounds said dog race track on the outer side. At some suitable location adjacent to the said track I have installed a raised platform or tower, as 32 within which are installed suitable electric switches, speed controllers, and such other electric mechanism as shall be best suited to control the operation of the conveyer as hereinafter described.

The housing for my conveyer track is constructed with the frame work of posts 1 and 2 arranged around the distance of the track in pairs, and at suitable distances apart. These posts are set in the ground as shown, and the posts 2 extend but a short distance above the surface of the ground, while the posts 1 extend above the top of the housing. The pairs of posts 1 and 2 are suitably connected together by the cross pieces 3, forming ties for supporting the rails for the conveyer track 4—4, and also for the third rail 5 which carries the electric current for operating the conveyer car hereinafter described. For the purpose of supporting the roof 1$^a$ of the housing, and the overhanging side toward the track, I have provided the brackets 6 mounted upon the inner sides of the posts 1 as shown, and I have also provided a truss rod 8 which is attached to the roof 1$^a$, passes over the top of the post 1, and is suitably anchored in the ground outside of the housing as at 9.

I have provided boards running lengthwise of the said course for lining said housing, as 12 fastened to the posts 1, 11 attached to the roof 1$^a$, 10 suspended from the ends of the roof 1$^a$, and 13 secured to the posts 2, these forming a complete inclosure of the said conveyer track and conveyer, with the exception of the space between the boards 10 and 13, where is provided an opening extending the entire circumference of the course for the purpose hereinafter explained.

Mounted to run upon the rails 4, 4 within the housing, I have provided an electric conveyer car, consisting of a frame of side bars 14, connected together by means of the cross bars 15 at their ends, and the additional cross bars 16 near the middle. Upon the cross bars 16 I have mounted a suitable electric motor 17 for propelling said conveyer car. Secured at suitable locations upon the side bars 14 I have provided the bearings 18 within which are journaled the axles 19, carrying at the outer ends thereof, the car wheels 21 rigidly attached thereon, and designed to run upon the rails of the track 4, 4. Mounted rigidly upon the axle at the front I have also provided a gear wheel as 22 in mesh with a corresponding gear wheel 23 mounted upon the shaft 24 of the motor 17, and designed to impart motion from the motor to the car wheels. At 25 on the side of said car toward the dog race course, I have hinge-mounted the arm 26 extending through the opening between the side boards 10 and 13 of the housing, and out toward the middle of the dog race course. Near the outer end of said arm I have mounted a wheel 28, preferably with rubber tire to rotate on the ground, and support the end of said arm 26. Above said wheel I have provided a platform 27 for mounting upon it the lure 29 in shape of a stuffed rabbit or other suitable object to entice the dogs to chase it. At the point 40 I have connected to said arm 26 a spring, extending to and attached to the frame as shown, designed to hold the said arm, and the wheel at the end of said arm down with the wheel in contact with the ground. At 41 on the frame of said car I have provided a bracket extending downward, and carrying at its lower end the contact shoe 42 in contact with the third rail 5, said shoe being connected by suitable wiring with the electric motor 17 for conveying the current received from the third rail to said motor.

At 43 I have provided a bracket extending upward from the frame of said conveyer car, and carrying at its upper extremity one or more shoes 44 for contact with the roof boards 11 of the housing, in case the car conveyer should jump off the rails, or for any reason should raise above said rails. Normally said shoes are out of engagement with the roof boards 11.

At 45 on the side bars of said conveyer car I have provided bearings for the brake rod shafts 46. Said brake rod shafts carry the brake shoes 47 positioned in proximity to the car wheels 21 and designed to engage said car wheels when required to brake the speed of said car, and to stop the same at the end of the run. Extending upwardly from said brake rod shaft I have provided the arms 48 having holes 49 bored near their extremity, through which passes the rod 50, threaded at its outer ends, and with nuts thereon, and a compression spring 51 for operating said brakes. The tension of said spring 51 may be increased or diminished by adjusting the nuts as desired.

Midway the length of said brake rod shafts I have provided another arm 52, extending both above and below said brake rod shaft. At the lower end of the arm 52 attached to the forward brake rod shaft, I have provided a rectangular opening, and a hole suitable for receiving a pin as 53 to hold the brake operating and releasing bar 54. At the rear the arm 52 is also provided with a rectangular opening at its lower end for receiving said brake releasing bar 54. Said brake releasing bar is constructed with several holes at its forward end for suitable adjustment by the pin 53, and at its rear end it is provided with a notch 55 for engaging the arm 52 at the rear, and when so engaged, holding the brake shoes 47 out of engagement with the car wheels. At a suitable point 60 in the course of the track, a trip is provided for engaging the rear curved end of the brake releasing bar 54, and disengaging it from the arm 52 at the rear of said car, permitting the springs 51 to press the shoes 47 into engagement with the car wheels, and by the friction reduce the speed of said car, and bring it to a stop after the electric power is shut off. The curved terminal portion of the bar 54 extends below the rest of the bracket mechanism and into the path of the projecting trip 60 so as to be engaged and lifted by the same. The curved terminal portion of the bar 54 presents a lower convex face to the trip and is lifted by the same sufficiently to cause the bar 54 to release the member 52 and permit the brake mechanism to operate. I have also provided rings as 55ª on the lower side of the frame of said car, designed to engage hooks mounted in the track at 56 for stopping said car at said point and holding it against forward movement in case the brakes shall for any reason be insufficient to bring the car to a stand still.

At 33 in the course of my track, I have provided a switch, with a track extending to the den or inclosure where the lure is to be concealed after the race. On the side of the housing toward the track at the point 33 I have provided a side door, mounted upon hinges as shown at 34. During the race said door 34 is held open by means of the catch 35, but as the race is completed, and the car conveyer passes over the switch in entering the den, it trips the said catch, and closes said door against the admission of the dogs. I have also provided a second door, as 36 at the entrance to the den, which is likewise held open during the race by the catch 37. As the car and lure pass through said door into the den, the catch is released by the trip 38 as shown.

At a suitable point, as 57, a cage is provided for retaining the dogs until the race is ready to be run. At 58 a judge's stand is provided, and in front of said judge's stand is provided a wire as usually employed on race courses for determining the winner. A grand stand may be provided as at 59 for accommodation of the audience.

In the operation of my said device, the conveyer car with the lure is backed out upon the track across the switch 33 and the car is started slowly around the course in the direction indicated by the arrow. The dogs are retained within the cage until the lure passes opposite said cage, and at a pre-determined time the barrier retaining said dogs is raised, and the dogs are simultaneously released, to pursue said lure. The lure is then carried around the track by the electric conveyer car, (or may be carried twice or more around in smaller tracks) and usually as the lure comes down the home stretch, the power is cut off, and the car permitted to run by its own momentum, with the dogs chasing. As the dogs pass under the wire, the judges decide which are the winners. When the race is finished by passing once or more around the course, the switch 33 is thrown to sidetrack the conveyer car onto the track leading to the den, and the lure is carried through the trap doors 34 and 36, which are closed behind the conveyer car and the lure, and thus conceal the lure from the dogs and prevent their further pursuit thereof. As the car passes the trip 60, the brake mechanism is released, and the brakes are applied to the car wheels, to bring said car to a stop within the den. In case the car does not stop before reaching the hooks 56, the rings depending from the lower side of the frame engage with said hooks and thus bring the car to a full stop.

Having thus described my invention, what I claim and desire to secure by Letters Patent, is the following:—

1. In a dog racing amusement, a race course suited for dogs, a casing extending around the outer side of the race course and provided with a longitudinal opening, a mechanical conveyer including a track extending around the race course and located within the casing, and a conveyer car mechanically operated upon said track and provided with an arm extending through the longitudinal opening of the casing in a projecting position over the track and adapted to carry a lure, and a wheel rotatably mounted on and supporting the arm at the projecting end thereof.

2. In an amusement, the combination of a race course suited for dogs, a covered rail track adjacent said course on one side, a conveyer car mechanically operated upon said track, a horizontally extending arm hinged to said car extending midway of said course, a wheel rotatably mounted near the end of said arm, and resting upon the ground, a platform supported by said arm and a lure or quarry mounted upon said platform for attracting the dogs.

3. In a dog racing amusement, the combination of a race course suited for dogs, a housing adjacent said course on one side having an opening in the side toward the course, a rail track within said housing, an electrically operated car within said housing for operation upon said rail track, an electric conductor within said housing, a shoe carried by the car for contact with said conductor, friction brakes adjacent the wheels of said car, means for holding said brakes out of contact with said wheels, means on the track for releasing said brakes, a hinged arm extending horizontally from said car through the opening in the side of the housing, a wheel mounted upon said arm for rotation upon the ground, a platform also mounted upon said wheel and a lure mounted upon said platform.

4. In a dog racing amusement, a race course suitable for dogs to race upon, a covered two rail track along one side of said course having a lateral opening on the side toward said course, a mechanically operated car for operation upon said track, an arm carried by said car extending through said opening, a wheel support for said arm resting upon said course, a decoy or lure mounted upon said arm, a spring for holding said wheel in contact with the ground, brake mechanism adjacent the wheels of the car, a trip along said track for releasing said brakes, springs for applying said brakes to said car wheels, when so released, a shoe carried by the car in proximity to the roof of said covering, for engagement with said roof whenever the car rises off the track rails, rings depending from the car and hooks at the end of the spur track for engaging the rings and stopping the car.

In testimony whereof, I have hereunto set my name in the presence a witness.

OWEN P. SMITH.

Witness:
M. J. PADDON.